(12) United States Patent
Elliott

(10) Patent No.: US 8,654,064 B2
(45) Date of Patent: Feb. 18, 2014

(54) BACKLIGHT HAVING BLUE LIGHT EMITTING DIODES AND METHOD OF DRIVING SAME

(75) Inventor: Candice Hellen Brown Elliott, Santa Rosa, CA (US)

(73) Assignee: Samsung Display Co., Ltd. (KR)

( * ) Notice: Subject to any disclaimer, the term of this patent is extended or adjusted under 35 U.S.C. 154(b) by 283 days.

(21) Appl. No.: 12/906,935

(22) Filed: Oct. 18, 2010

(65) Prior Publication Data

US 2012/0091912 A1    Apr. 19, 2012

(51) Int. Cl.
G09G 3/36    (2006.01)

(52) U.S. Cl.
USPC ............... 345/102; 345/76; 345/77; 345/82; 345/83; 345/88; 362/97.1; 362/97.2; 362/97.3

(58) Field of Classification Search
USPC ............. 345/102, 76–77, 82–83, 87–88; 362/97.1–97.3
See application file for complete search history.

(56) References Cited

U.S. PATENT DOCUMENTS

| | | | |
|---|---|---|---|
| 6,577,073 B2 * | 6/2003 | Shimizu et al. ............... 315/246 |
| 7,023,019 B2 * | 4/2006 | Maeda et al. ............... 257/89 |
| 7,422,504 B2 * | 9/2008 | Maeda et al. ............... 445/24 |
| 7,477,009 B2 * | 1/2009 | Nagatomi et al. ............ 313/487 |
| 7,964,885 B2 * | 6/2011 | Yoo et al. .................... 257/98 |
| 8,148,887 B2 * | 4/2012 | Hirosaki et al. .............. 313/486 |
| 8,269,410 B2 * | 9/2012 | Kijima et al. ................ 313/501 |
| 8,277,687 B2 * | 10/2012 | Takahashi et al. ...... 252/301.4 H |
| 2004/0178975 A1 * | 9/2004 | Benedict ...................... 345/84 |
| 2005/0073495 A1 * | 4/2005 | Harbers et al. .............. 345/102 |
| 2006/0138435 A1 * | 6/2006 | Tarsa et al. .................. 257/89 |
| 2008/0048193 A1 * | 2/2008 | Yoo et al. ..................... 257/89 |
| 2008/0084706 A1 * | 4/2008 | Roshan et al. ............... 362/601 |
| 2008/0180948 A1 * | 7/2008 | Yoon et al. .................. 362/230 |
| 2008/0203419 A1 * | 8/2008 | Harada ......................... 257/98 |
| 2008/0265269 A1 * | 10/2008 | Yoo et al. ..................... 257/98 |
| 2009/0140630 A1 * | 6/2009 | Kijima et al. ................ 313/498 |
| 2010/0253613 A1 * | 10/2010 | Dunn et al. .................. 345/102 |
| 2011/0007104 A1 * | 1/2011 | Nakazawa et al. ........... 345/690 |
| 2011/0095329 A1 * | 4/2011 | Hwang ......................... 257/99 |
| 2011/0180780 A1 * | 7/2011 | Yoo et al. ..................... 257/13 |
| 2011/0210358 A1 * | 9/2011 | Kim et al. .................... 257/98 |
| 2011/0242437 A1 * | 10/2011 | Yoo et al. .................... 348/790 |
| 2012/0273813 A1 * | 11/2012 | Jung ............................. 257/88 |

FOREIGN PATENT DOCUMENTS

EP    1403934 A1    3/2004
JP    2009104844 A    5/2009

OTHER PUBLICATIONS

European Search Report corresponding to EP 11185509.4, Dec. 14, 2011, 4 pages.

* cited by examiner

Primary Examiner — Lun-Yi Lao
Assistant Examiner — Peter D McLoone
(74) Attorney, Agent, or Firm — Innovation Counsel LLP

(57) ABSTRACT

An LED backlight array in which every LED, regardless of whether it is a red, green, cyan, or blue LED, contains a blue emitter. As each LED contains the same type of emitter, the backlight can be driven by a single blue driver circuit, rather than separate red, green, cyan, and blue drivers. That is, the present disclosure removes the need for red, cyan, and green driver circuits, allowing for simpler and cheaper backlights. Additionally, even though the LED backlight can contain LEDs of different colors, each has a blue emitter, and thus possesses similar aging characteristics.

7 Claims, 3 Drawing Sheets

| EMITTER COLOR | LED | PHOSPHOR | POLYMER |
|---|---|---|---|
| R | BLUE | RED | BLUE-BLOCKING |
| G | BLUE | GREEN | BLUE-BLOCKING |
| B | BLUE | – | TRANSPARENT |
| C | BLUE | CYAN | BLUE-BLOCKING |

_US 8,654,064 B2_

BACKLIGHT HAVING BLUE LIGHT EMITTING DIODES AND METHOD OF DRIVING SAME

FIELD OF INVENTION

This disclosure relates generally to flat panel displays. More specifically, this disclosure relates to display backlights having blue light emitting diodes (LEDs) and their driving methods.

BACKGROUND

The rise in popularity of flat-panel displays has led to an increase in demand for displays utilizing various display technologies, such as liquid crystal displays (LCDs) and the like. In a typical implementation of an LCD, a layer of liquid crystal is sandwiched between two panels each having an array of electrodes. Switching certain electrodes on and off generates an electric field between opposing electrodes of the two panels, manipulating the liquid crystal director orientation, effecting the polarization of light being transmitted. When a separate crossed polarizing filter is placed over the panels and light is projected through the liquid crystal, an image is generated.

As this liquid crystal panel does not generate its own illumination, a typical LCD employs a backlight for projecting light through the liquid crystal. Backlights can use various illumination sources, such as fluorescent lights or light emitting diodes (LEDs). Backlights utilizing LEDs as illumination sources often use arrays of red, green, and blue LEDs that collectively produce white light. However, such multi-color LED backlights are not without their challenges. For example, each different color typically requires different drive voltages and currents, so that a separate driver circuit is often required for each color LED used. Additionally, each color LED often experiences a different aging characteristic (e.g., variation in visual properties of the LED over time, such as reduction in brightness or shift in color).

SUMMARY

The invention can be implemented in a number of ways. For example, the invention can be embodied in a display backlight.

In one embodiment, a backlight for a display comprises a backlight having a plurality of light emitters configured to collectively generate white light. The plurality of light emitters includes a plurality of red emitters each having a blue light emitting diode (LED) and configured to emit red light. The light emitters also include a plurality of green emitters each having a blue LED and configured to emit green light, and a plurality of blue emitters each having a blue LED and configured to emit blue light.

In another embodiment, a backlight system for a display comprises a plurality of light emitters, and a driver circuit in electrical communication with each emitter of the plurality of light emitters. The driver circuit is configured as a blue light emitting diode (LED) driver. Also, the plurality of light emitters includes red emitters having blue LEDs and configured to emit red light, and green emitters having blue LEDs and configured to emit green light.

In a further embodiment, a backlight for a display comprises a backlight having a plurality of light emitters configured to collectively generate white light. The plurality of light emitters includes a plurality of red emitters each having a blue light emitting diode (LED) and configured to emit red light, and a plurality of red emitters each having a blue light emitting diode (LED) and configured to emit cyan light. Also included in the plurality of light emitters are a plurality of green emitters each having a blue LED and configured to emit green light, and a plurality of blue emitters each having a blue LED and configured to emit blue light.

In a still further embodiment, a backlight system for a display comprises a plurality of light emitters, and a driver circuit in electrical communication with each emitter of the plurality of light emitters. The driver circuit is configured as a blue light emitting diode (LED) driver. Furthermore, the plurality of light emitters includes red emitters having blue LEDs and configured to emit red light, cyan emitters having blue LEDs and configured to emit cyan light, and green emitters having blue LEDs and configured to emit green light.

Other aspects and advantages of the here disclosed invention will become apparent from the following detailed description taken in conjunction with the accompanying drawings.

BRIEF DESCRIPTION OF THE DRAWINGS

For a better understanding of the disclosure, reference is made in the following detailed description to the accompanying drawings, in which.

Like reference numerals refer to corresponding parts throughout the drawings.

DETAILED DESCRIPTION OF EMBODIMENTS OF THE INVENTION

Conventional LED backlights utilize light emitters with different-color LEDs, thus requiring separate drivers for each color and resulting in a backlight in which different emitters age differently. This results in, respectively, backlights with excessively complex and expensive driver circuitry, as well as backlights whose different emitters begin to perform differently over time, resulting in undesired lighting effects.

In contrast, the present disclosure provides an LED backlight array in which every light emitter, regardless of whether it is a red, green, blue or cyan emitter, contains a blue LED. As each emitter contains the same type of LED, the backlight can be driven by a single blue driver circuit, rather than separate red, green, blue or cyan drivers. That is, the present disclosure removes the need for red and green driver circuits, allowing for simpler and cheaper backlights. Additionally, even though the LED backlight can contain emitters of different colors, each has a blue LED, and thus possesses similar aging characteristics.

Figure 1:
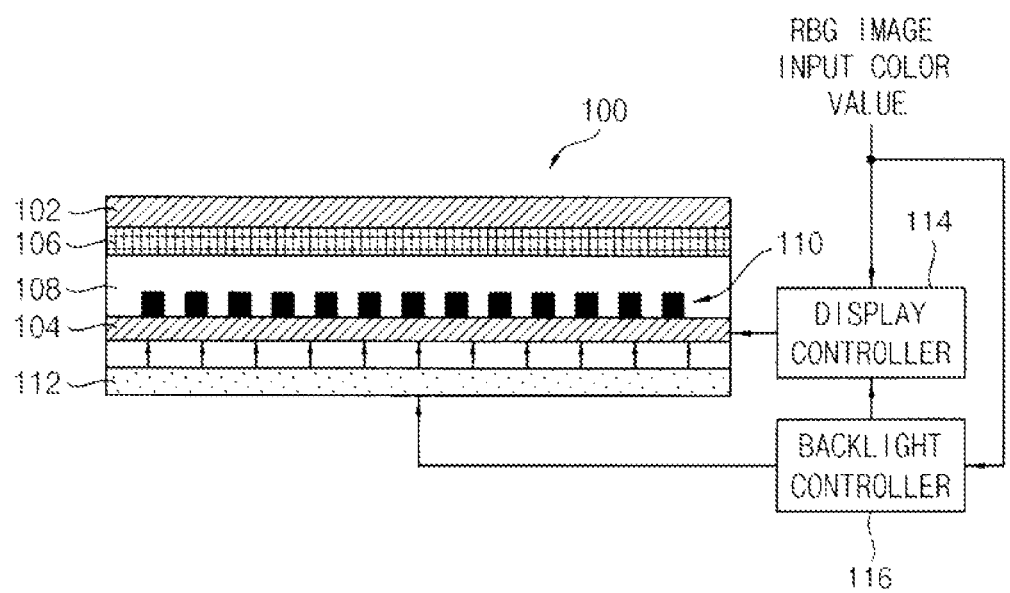
FIG. 1 is a cross-sectional view of an LCD display suitable for use with embodiments of the invention.

FIG. 1 is a cross-sectional view of an LCD display suitable for use with embodiments of the invention. Here, LCD display 100 includes transparent substrates 102, 104, as well as a color filter 106 and liquid crystal layer 108 sandwiched therebetween. The lower substrate 104 has a thin film transistor (TFT) array 110 fabricated thereon. As above, each TFT has an electrode for generating an electric field between itself and the upper substrate 102, manipulating the orientation of the director of the liquid crystal layer 108 in that area and affecting the polarization of the transmitted light. Cross-polarized light emitted from the backlight 112 through a polarizer (not shown) is thus selectively blocked, to generate an image. Light passing through areas of the liquid crystal 108 is colored by color filter 106 array, producing a colored image, as is well understood in the art. Display controller 114 processes input RGB image data to determine which TFTs to switch on (thus displaying the RGB image), while backlight controller 116 controls the illumination level(s) of backlight 112. If desired, the RGB input image values are also input to backlight controller 116, so that the backlight controller 116 can vary the illumination of selected areas of the backlight 112 according to the particular image displayed. Such an approach is taught in, for example, U.S. patent application Ser. No. 12/303,102, filed on May 14, 2007 and entitled "High Dynamic Contrast Display System Having Multiple Segmented Backlight," which is hereby incorporated by reference in its entirety and for all purposes.

Figure 2:
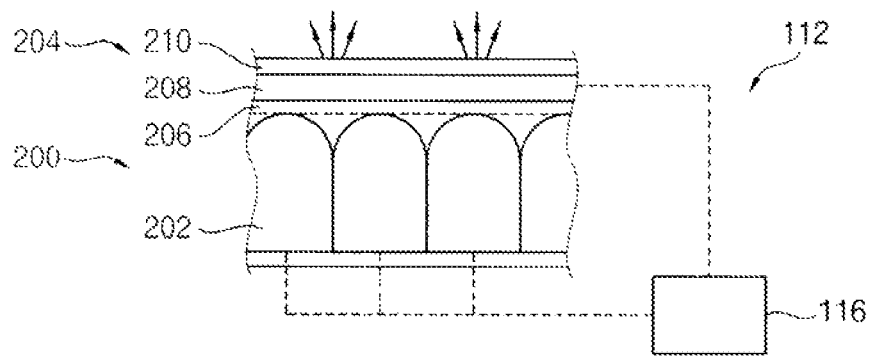
FIG. 2 illustrates further details of the LCD display of FIG. 1.

FIG. 2 illustrates further details of the LCD display of FIG. 1. In particular, backlight 112 is illustrated in greater detail. More specifically, backlight 112 includes an array 200 of light emitters 202, as well as a rear-projection screen 204. Screen 204 includes a diffuser 206, light modulator 208, and diffusing layer 210. Backlight controller 116 controls the illumination of emitters 202. The modulator 208 can modify light as desired. However, in some embodiments, the modulator 208 can simply be a transparent substrate. In operation, controller 116 activates emitters 202 in a pattern based on the image to be displayed, illuminating the rear face of the LCD. Light is passed through diffuser 206 and diffusing layer 210 and on to the remainder of the LCD display 100, which selectively passes and colors light so as to reconstruct a desired image.

General configuration and operation of LCD display 100, and in particular backlight 112, are known. However, many conventional backlights 112 employ arrays 200 having groups of primary color emitters, e.g., groups of red, green, and blue emitters that collectively emit white light. As above, these types of LED arrays suffer from the disadvantages of requiring more complicated driver circuits within backlight controller 116, and having differing aging characteristics that lead to non-uniform lighting effects over time.

Embodiments of the invention rectify this problem with arrays 200 having groups of primary color emitters that each use blue LEDs. That is, the array 200 can have red (R) emitters, green (G) emitters, and blue (B) emitters, each with a blue LED. This allows for backlights 112 that emit white light from primary color emitters, yet have simpler driver circuits and age more uniformly.

Figures 3, 4:
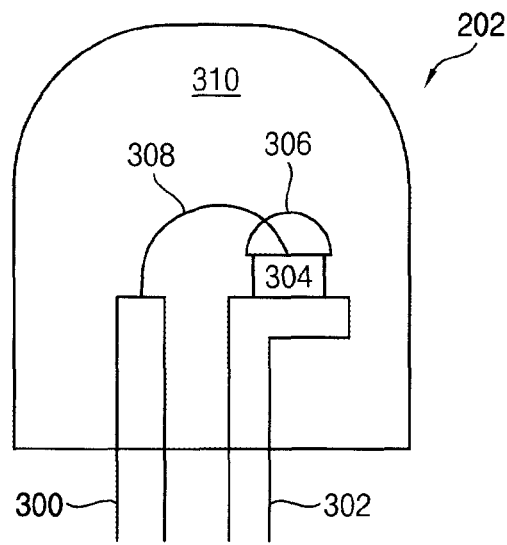
FIG. 3 illustrates an LED constructed in accordance with embodiments of the invention.
FIG. 4 illustrates further LED configurations that can be utilized in accordance with embodiments of the invention.

The invention contemplates any colors for emitters 202, and any arrangement of such colors, so long as each has a blue LED. In particular, the invention contemplates any arrangement of RGB emitters. Attention now turns to details of the construction of such emitters. FIG. 3 illustrates an emitter constructed in accordance with embodiments of the invention. An exemplary emitter 202 has an anode 300 and cathode 302, a blue LED 304 bonded to cathode 302 with a conductive adhesive (not shown), a phosphor or nanoparticle photoconverter (e.g. "quantum dots") 306 deposited atop the blue LED 304, and a bond wire 308 electrically connecting the anode 300 to an end of the LED 304 opposite the cathode 302. Casing 310 at least partially encapsulates these components, and can be a blue-blocking polymer that transmits light frequencies outside the blue range. The casing 310 can also be referred to as a lens.

Light emitted by blue LED 304 is absorbed partly by phosphor or nanoparticle photoconverter 306 and partly by the blue-blocking material of casing 310. Phosphor or nanoparticle photoconverter 306 emits its own light responsive to the blue light it absorbs from LED 304. Light emitted by phosphor or nanoparticle photoconverter 306 passes through the casing 310 (so long as it is not blue) to illuminate LCD display 100. One of ordinary skill in the art will realize that this allows emitters 202 to be configured to generate any primary color. For example, emitter 202 can be configured as a red emitter by utilizing a phosphor or nanoparticle photoconverter 306 that emits red light, and a blue-blocking casing 310 such as a yellow polymer casing. Similarly, emitter 202 can be configured as a green emitter by employing a phosphor or nanoparticle photoconverter 305 that emits green light, along with a blue-blocking casing such as that used with the red emitter (i.e., a yellow polymer casing). Likewise, emitter 202 can be configured as a cyan emitter by employing a phosphor or nanoparticle photoconverter 305 that emits cyan light, along with a blue-blocking casing. A blue emitter can omit phosphor or nanoparticle photoconverter 306, and can utilize a transparent casing, or any other casing that transmits blue light.

These configurations are summarized in FIG. 4 which is a table listing, in order from left to right, each desired primary color (R, G, B, or C) for an emitter 202, the LED used (blue in each case), the color of light emitted by the phosphor or nanoparticle photoconverter 306 used, and the type of casing 310. As can be seen from FIG. 4, blue LEDs can form the basis for R, G, B, or C emitters. One of ordinary skill in the art will also observe that blue LEDs can also be used in emitters of various other colors. For example, white (W) LEDs can be made from blue LEDs 304 with a yellow-emitting phosphor or nanoparticle photoconverter 306 and transparent casing 310. Cyan (C) LEDs can be made from blue LEDs 304 with a cyan emitter which emits light that peaks between 490 nm and 505 nm, with a peak at 505 nm preferred for some applications. In this manner, arrays 200 of the invention can utilize emitters with any set of primary colors. Thus, for example, arrays 200 can emit white light using emitters with an RGB primary configuration, or using a multiprimary configuration such as RGBY, RGBC, RGBW, or RGBCY. Indeed, the invention contemplates arrays 200 with emitters of any colors, arranged in any order, so long as the emitters employ blue LEDs. As primary or multiprimary configurations are employed, emitters of such arrays can collectively emit white light, or light of any other desired color.

Figure 5:
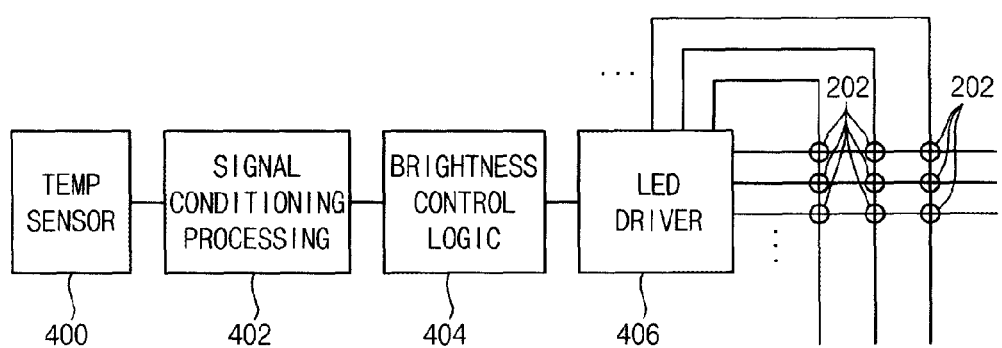
FIG. 5 is a block diagram representation of LED driver circuitry for driving backlights of the invention.

As each emitter 202 of array 200 uses a blue LED, the electrical characteristics of each emitter 202 are similar even though different emitters 202 emit different colors. Each can thus be driven by the same driver circuit. FIG. 5 is a block diagram representation of such LED driver circuitry. In particular, a temperature sensor 400, signal conditioning and processing block 402, brightness control logic 404, and LED driver circuit 406 can be used to drive emitters 202.

As described previously, current displays must often implement a separate driver block 406 for each color emitter. Thus, for example, a typical conventional RGB backlight would require three LED driver blocks 406, one specifically configured to drive R emitters, one configured to drive G emitters, and one to drive B emitters. In contrast, the present disclosure requires only one LED driver block 406, configured to drive blue emitters.

In operation, the brightness control logic 404 can be programmed to follow a temperature compensation curve, so as to direct the LED driver circuit 406 to drive the emitters 202 at differing illuminations depending on their temperature.

More specifically, it is known that the emission intensity and spectra of LEDs vary according to LED temperature. Furthermore, these temperature-dependent emission characteristics differ for red, green, and blue LEDs. Accordingly, a compensation curve is typically measured for each color LED, and used to correct the intensity of an LED based on its temperature. Thus, conventional implementations may drive LEDs using a pulse width modulation (PWM) scheme, where the PWM duty cycle is changed with LED temperature according to the compensation curve measured and stored for that particular LED. As electrical properties and compensation curves vary by LED color, this typically requires a separate driver circuit and separate compensation curve for each color LED. For example, a conventional RGB backlight would require a red driver circuit driving only the red LEDs and storing a compensation curve specific to red LEDs, a separate green driver circuit for the green LEDs and storing a green-specific compensation curve, and a separate blue driver circuit storing a blue-specific compensation curve. As embodiments of the invention utilize only blue LEDs, one of ordinary skill in the art will observe that such embodiments require only a blue driver circuit storing a blue compensation curve, even though an array 200 may include red, green, blue, or other color emitters.

Thus, the brightness control logic 404 can store (or otherwise have accessible) a compensation curve determined for blue LEDs. Temperature sensor 400 measures the temperature of emitters 202 and generates a corresponding electrical signal that is conditioned by block 402 and forwarded to brightness control logic 404. The compensation curve stored/accessed by logic 404 relates emitter temperature to whatever quantity is used in the driving scheme used by LED driver 406. Thus, for example, if the logic 404 and driver 406 drive illumination of the emitters 202 according to a PWM scheme, the compensation curve would relate emitter temperature to PWM duty cycle (i.e., duty cycle as a function of temperature), maintaining constant brightness over temperature by adjusting the duty cycle. Brightness control logic 404 would thus use the temperature value received from block 402, determine the corresponding PWM duty cycle from its compensation curve, and direct the LED driver 406 to drive emitters 202 according to that duty cycle.

The generation and storage of such compensation curves are known. However, it is noted that the present disclosure provides the advantage of requiring generation/storage of fewer such compensation curves. Previously, each different color LED required a separate compensation curve, so that displays utilizing different color emitters had to store, and simultaneously utilize, multiple curves. In contrast, the present disclosure allows for displays that utilize different color emitters, but only require storage/use of a single compensation curve, i.e. a compensation curve for blue LEDs.

Furthermore, even though the above disclosure specifically references PWM driving schemes, one of ordinary skill in the art will realize that the disclosure is not limited to any particular driving schemes, and in fact encompasses any approach to driving emitters 202. Indeed, the present disclosure provides advantages for many different driving schemes, as such schemes are typically simplified by the need to drive only a single type of LED (blue), rather than multiple types.

Additionally, one of ordinary skill in the art will realize that embodiments of the invention allow driver 406 to drive blocks of emitters 202, or even each emitter 202, independently. That is, each emitter 202 or group of emitters 202 can be independently addressable from a single driver 406, as only one color LED must be driven.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, embodiments of the invention contemplate use of any color emitter, so long as a blue LED is employed. Also, displays can utilize any arrangement of emitter colors. The embodiments were chosen and described in order to best explain the principles of the invention and its practical applications, to thereby enable others skilled in the art to best utilize the invention and various embodiments with various modifications as are suited to the particular use contemplated

What is claimed is:

1. A backlight for a display, comprising:
a backlight having a plurality of light emitters configured to collectively generate white light, the plurality of light emitters including:
a plurality of red emitters each having a blue light emitting diode (LED) and configured to emit red light;
a plurality of green emitters each having a blue LED and configured to emit green light; and
a plurality of blue emitters each having a blue LED and configured to emit blue light;
wherein each of the red emitters further comprises one of the blue LEDs, a red phosphor or nanoparticle photoconverter configured to convert blue light from the one of the blue LEDs to red light, and a casing surrounding the one of the blue LEDs and configured both to pass the red light and to block the blue light;
wherein each of the green emitters further comprises another one of the blue LEDs, a green phosphor or nanoparticle photoconverter configured to convert blue light from the another one of the blue LEDs to green light, and a casing surrounding the another one of the blue LEDs and configured both to pass the green light and to block the blue light;
wherein the red phosphor or nanoparticle photoconverter is disposed on the one of the blue LEDs, makes contact with the one of the blue LEDs, and leaves one or more sides of the one of the blue LEDs exposed, and
wherein the green phosphor or nanoparticle photoconverter is disposed on the another one of the blue LEDs, makes contact with the another one of the blue LEDs, and leaves one or more sides of the another one of the blue LEDs exposed,
wherein the casing of each red emitter is a yellow polymer casing, and
wherein the casing of each green emitter is a yellow polymer casing.

2. The backlight of claim 1, further comprising a driver circuit in electrical communication with each emitter of the plurality of red emitters, the plurality of green emitters, and the plurality of blue emitters, wherein the driver circuit is further configured as a blue LED driver.

3. The backlight of claim 2:
wherein the driver circuit is further configured to adjust illuminations of the plurality of light emitters according to a compensation curve relating temperatures of the plurality of light emitters to desired ones of the illuminations; and wherein the driver circuit is further configured to adjust the illuminations of the red emitters, the green emitters, and the blue emitters according to the same compensation curve.

4. The backlight of claim 1, wherein each LED of the plurality of LEDs is independently controllable.

5. A backlight system for a display, the backlight system comprising:
- a plurality of light emitters; and
- a driver circuit in electrical communication with each emitter of the plurality of light emitters;
- wherein the driver circuit is configured as a blue light emitting diode (LED) driver; and
- wherein the plurality of light emitters includes red emitters having blue LEDs and configured to emit red light, and green emitters having blue LEDs and configured to emit green light;
- wherein each of the red emitters further comprises one of the blue LEDs, a red phosphor or nanoparticle photoconverter configured to convert blue light from the one of the blue LEDs to red light, and a casing surrounding the one of the blue LEDs and configured to pass the red light;
- wherein each of the green emitters further comprises another one of the blue LEDs, a green phosphor or nanoparticle photoconverter configured to convert blue light from the another one of the blue LEDs to green light, and a casing surrounding the another one of the blue LEDs and configured both to pass the green light and to block the blue light;
- wherein the red phosphor or nanoparticle photoconverter is disposed on the one of the blue LEDs, makes contact with the one of the blue LEDs, and leaves one or more sides of the one of the blue LEDs exposed, and
- wherein the green phosphor or nanoparticle photoconverter is disposed on the another one of the blue LEDs, makes contact with the another one of the blue LEDs, and leaves one or more sides of the another one of the blue LEDs exposed,
- wherein the casing of each red emitter is a yellow polymer casing, and
- wherein the casing of each green emitter is a yellow polymer casing.

6. The backlight system of claim 5, wherein the plurality of light emitters further includes blue emitters having blue LEDs and configured to emit blue light.

7. The backlight of claim 5:
- wherein the plurality of light emitters further includes blue emitters;
- wherein the driver circuit is further configured to adjust illuminations of the plurality of light emitters according to a compensation curve relating temperatures of the plurality of light emitters to desired ones of the illuminations; and
- wherein the driver circuit is further configured to adjust the illuminations of the red emitters, the green emitters, and the blue emitters according to the same compensation curve.

* * * * *